Jan. 5, 1960   J. G. E. HILLMAN   2,919,529
APPARATUS FOR COLLECTING CIGARETTES
Filed Oct. 16, 1957   10 Sheets-Sheet 2
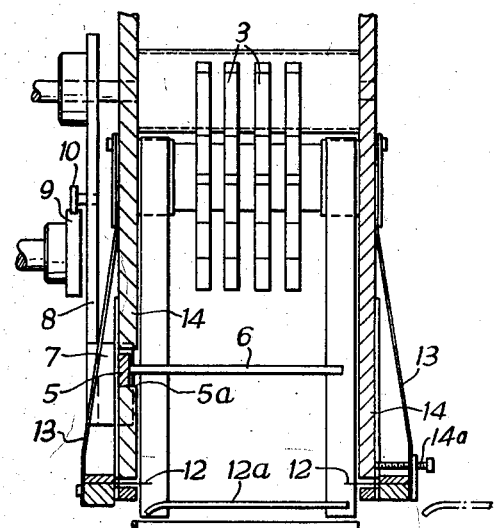
Fig.2.
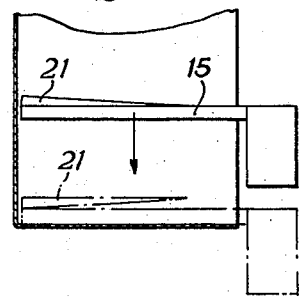
Fig.4.
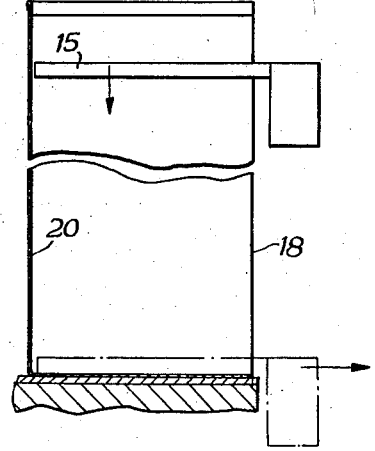
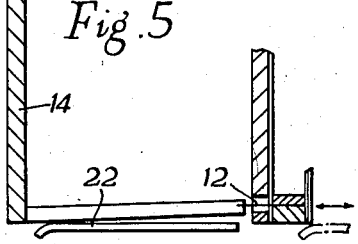
Fig.5
Fig.6.
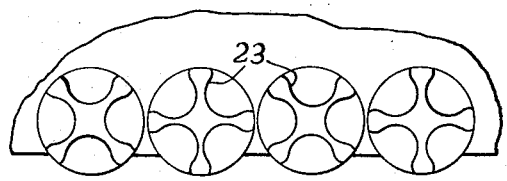
INVENTOR
James G.E Hillman
BY
Watson, Cole, Grindle + Watson
ATTORNEYS

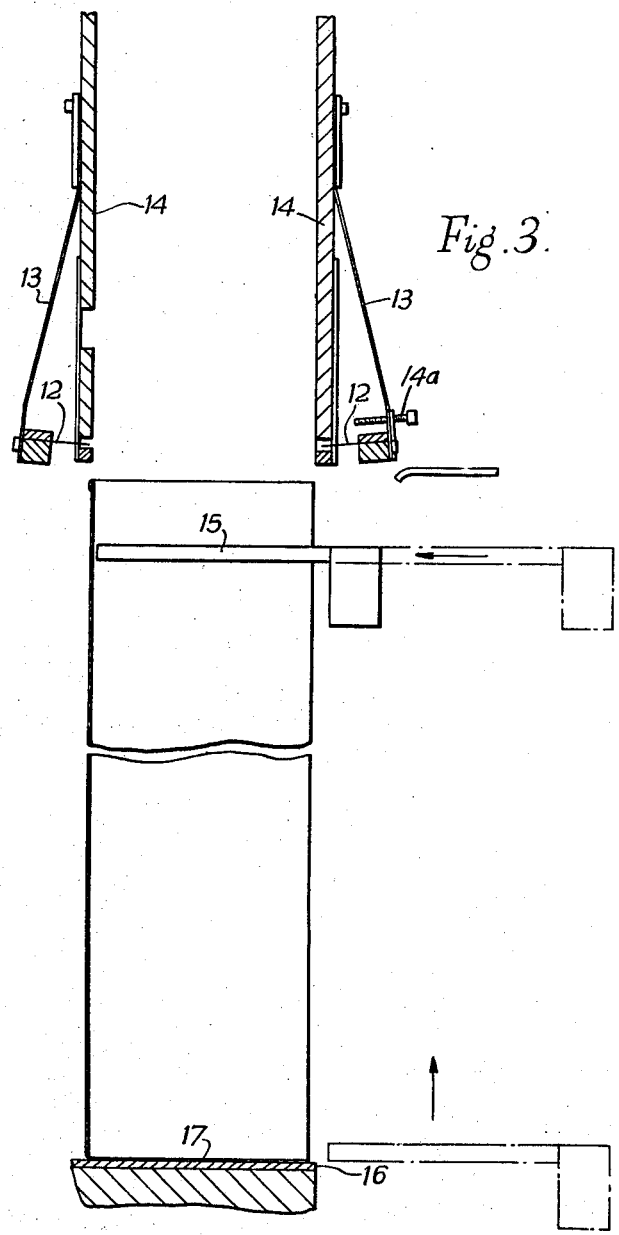

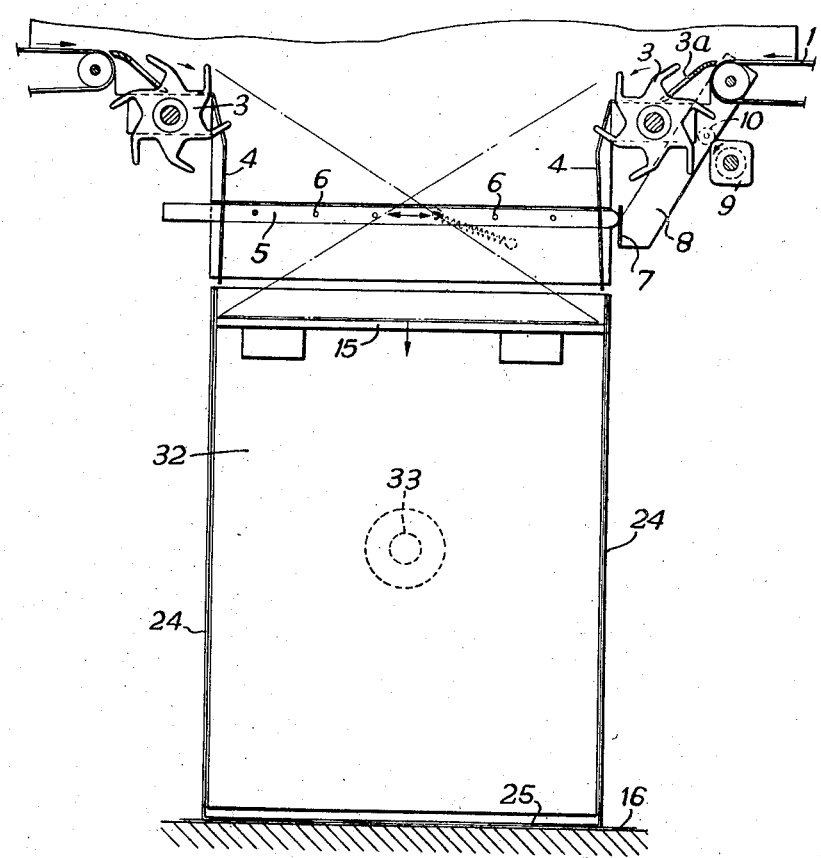

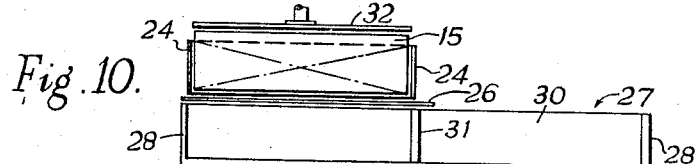
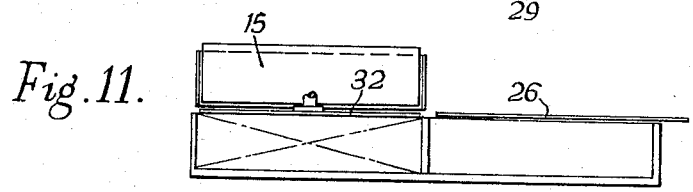
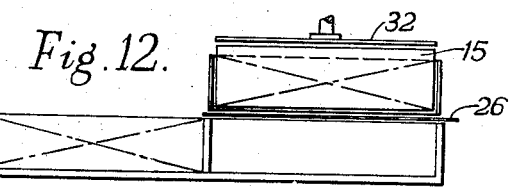
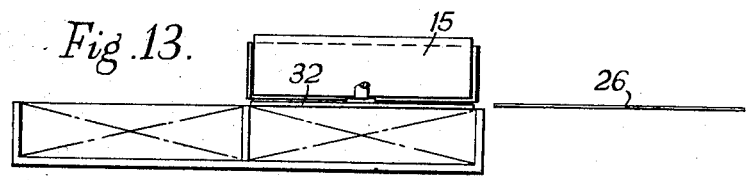
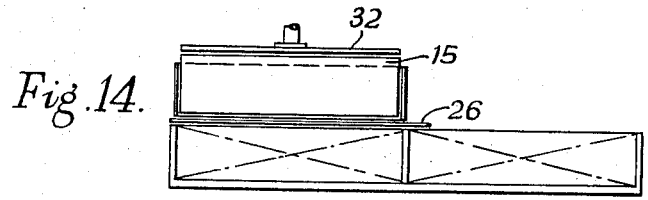
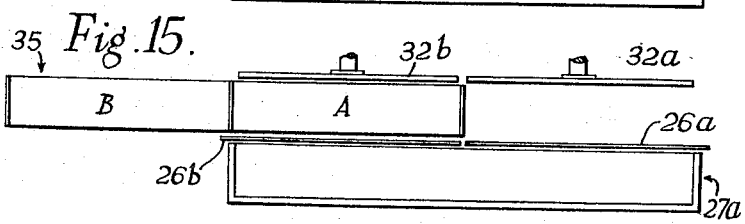

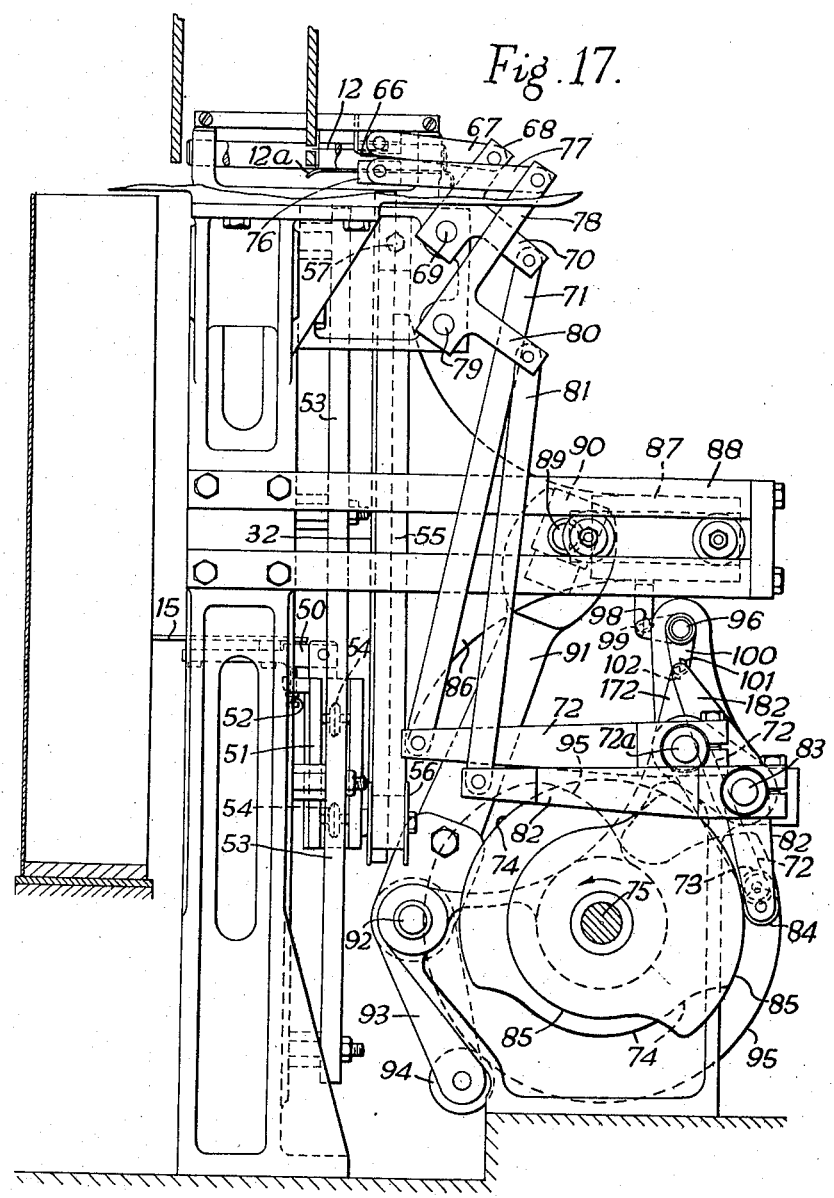

Jan. 5, 1960  J. G. E. HILLMAN  2,919,529
APPARATUS FOR COLLECTING CIGARETTES
Filed Oct. 16, 1957  10 Sheets-Sheet 10
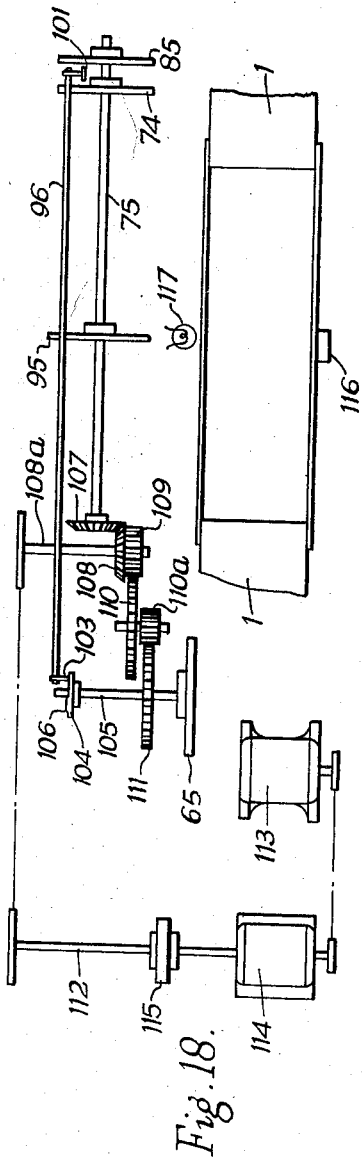
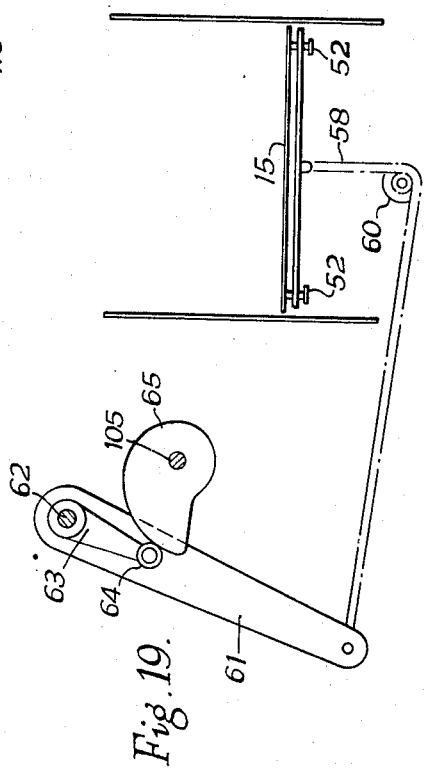
INVENTOR
James G.E. Hillman
BY
Watson, Cole, Grindle & Watson
ATTORNEYS

United States Patent Office 2,919,529
Patented Jan. 5, 1960

2,919,529

APPARATUS FOR COLLECTING CIGARETTES

James George Edward Hillman, Deptford, London, England, assignor to Molins Machine Company Limited, London, England, a British company Application October 16, 1957, Serial No. 690,475

Claims priority, application Great Britain October 18, 1956

10 Claims. (Cl. 53—148)

This invention concerns improvements in or relating to apparatus for collecting cigarettes in receptacles (e.g. cigarettes coming from a cigarette-making machine).

According to the present invention there is provided apparatus for collecting cigarettes, comprising means to feed cigarettes (e.g. from a cigarette-making machine) to a collecting station from which they can move downwardly into a stationary receptacle, and means to arrest the downward movement of further cigarettes from said station after a desired quantity has moved downwardly. The said means may be arranged to arrest the downward movement of said further cigarettes until the said desired quantity has been moved away.

The apparatus may comprise a support for cigarettes, said support being arranged to move downwardly within the receptacle to lower cigarettes, and thereafter to move upwardly in order to receive further cigarettes.

Means may be provided to transfer cigarettes from the said receptacle into a container which can then be moved away and replaced by another container. The said means to transfer cigarettes may comprise a pusher arranged to push the cigarettes bodily from the receptacle into an adjacent container. In such a case the receptacle may be maintained in a fixed position, and the support can then be moved upwardly, as well as downwardly, inside the receptacle. Or two receptacles may be brought one after the other beneath the collecting station and filled in turn, and the cigarettes then pushed simultaneously from both receptacles into a single container which is of twice the length of each of the receptacles. In this case the two receptacles are returned to their original position after each transfer of cigarettes from them to the container.

Alternatively the said receptacle into which the cigarettes move downwardly may itself be moved away after a desired quantity of cigarettes has been fed into it, and may be replaced by a further such receptacle. The said support may in that case, after moving downwardly, be moved sideways out of the said receptacle to permit lengthwise movement of the latter.

The means to arrest the downward movement of cigarettes from the collecting station may comprise a row of needles or like elements arranged to be moved towards cigarettes so as to penetrate end faces of cigarettes at a desired level and to hold them at that level, and thereafter to be moved away to release the said cigarettes. Two such rows of needles may be provided, arranged one at each side of the body of cigarettes moving through the collecting station.

The cigarettes are fed in such a way as to be arranged stackwise in the collecting station and in the receptacles, the lengthwise axes of all the cigarettes being parallel and the end faces of the cigarettes forming the sides of the stack. Thus the needles referred to above as being arranged to penetrate the end faces of the cigarettes are directed towards one or both sides of the stack.

A support plate may be arranged to be inserted into the position beneath the cigarettes held by the needles after the cigarettes below the level of the needles have moved down in the receptacle far enough to enable the said plate to be so inserted.

Alternatively the means to arrest downward movement of cigarettes may comprise a number of parallel members, e.g. fluted rollers, which are movable, e.g. rotatable, so as to allow cigarettes to fall downwardly between them, but which when stationary prevent such downward movement.

In all cases cigarettes may be fed to the collecting station in two streams moving towards each other; for example they may be fed by catcher bands from two side-by-side cigarette-making machines, the catcher bands moving in oposite directions towards each other and towards the collecting station.

Further according to the invention there is provided automatic cigarette collecting apparatus, comprising a collecting station, means to feed cigarettes to said station, a receptacle beneath said station to receive cigarettes therefrom, a platform movable downwardly in the said receptacle to support cigarettes while lowering them, means operative in timed relationship with the movement of said platform to prevent downward movement of cigarettes above a desired level when a desired quantity of cigarettes has been lowered into the receptacle, and a pusher operative in timed relationship with the movement of said platform to push the said quantity of cigarettes bodily out of the receptacle into an adjacent container. The apparatus may comprise detector means to detect the quantity of cigarettes in said collecting station, and means (e.g. a clutch) responsive to said detector means to arrest the operation of said platform if the level of cigarettes in the collecting station falls below a predetermined level.

Still further according to the invention there is provided in cigarette-feeding apparatus, means to support a stack of cigarettes, comprising a row of needles or like elements ararnged to penetrate end faces of the lower-most cigarettes of the stack to be supported.

Still further according to the invention there is provided in cigarette-feeding apparatus in which cigarettes are fed downwardly in stack-like parallel arrangement, means to arrest the downward movement of cigarettes above a desired level, comprising a row of needles or like elements arranged to be moved towards the cigarettes so as to penetrate end faces of cigarettes at the said level.

The word "receptacle" where used above is to be understood as including a single structure, as well as, where the context permits, one of a plurality of compartments formed in a single structure; and a similar meaning is intended to be given to the word "container." Thus a single structure adapted to receive cigarettes may be divided into two compartments by a central partition, each compartment constituting a "receptacle" or a "container" in the sense in which these words are used above.

Apparatus in accordance with the invention will now be described by way of example with reference to the drawings.

Figure 2 is a sectional end view;

Figure 3 is a view similar to Figure 2 but showing some of the parts in different positions;

Figures 4, 5 and 6 illustrate modifications of parts of the apparatus shown in Figures 1, 2 and 3;

Figure 7 is a side elevation illustrating an alternative arrangement to that shown in Figure 1;

Figures 10–14 are diagrammatic plan views illustrating the sequence of operation of the apparatus shown in Figures 7, 8 and 9;

Figure 15 is a diagrammatic plan view of a modification of the apparatus shown in Figures 7, 8 and 9;

Figure 17 is a partial end view of the apparatus shown in Figure 16, showing further operating mechanism;

Figure 18 is a diagrammatic view showing the driving arrangements; and

Figure 19 diagrammatically illustrates the mechanism for lowering the platform.

Figure 1:
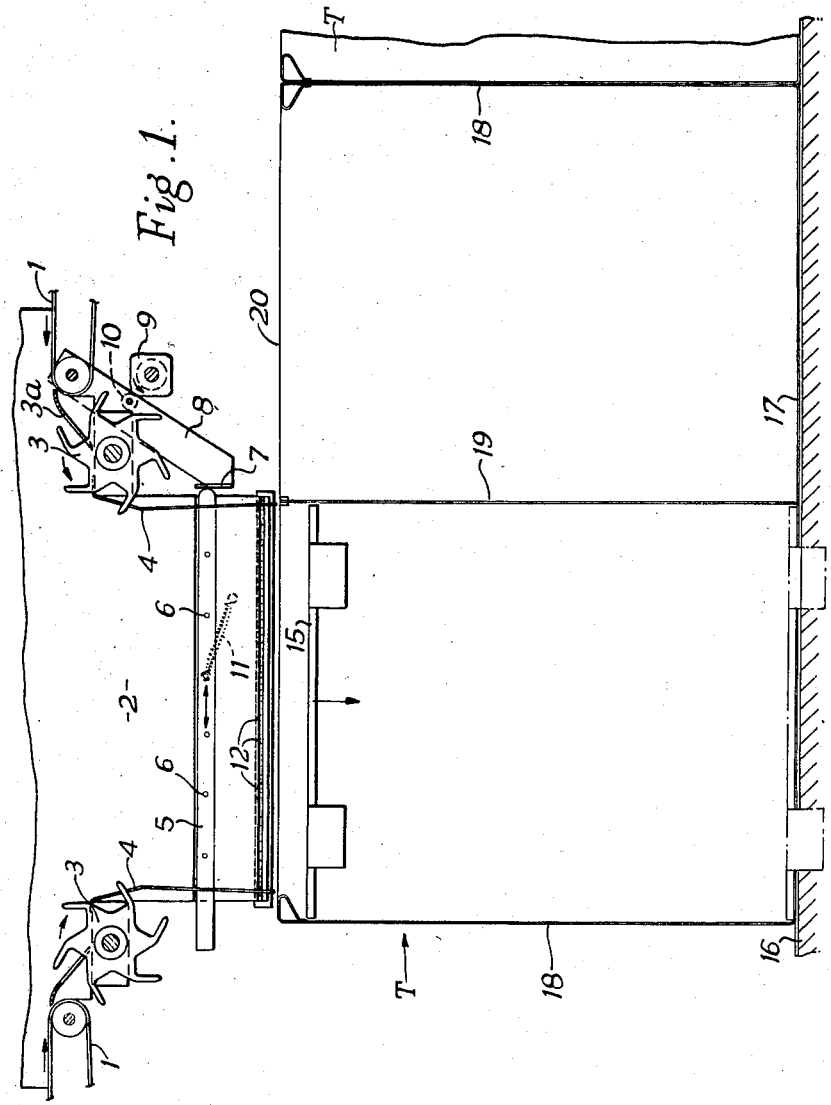
Figure 1 is a side elevation.

Referring first to Figure 1, two catcher bands 1 are associated with two side-by-side cigarette-making machines (not shown), which are arranged similarly to those described and illustrated in:

The bands 1, as indicated by the arrows, move towards each other in opposite directions. Paddle wheels 3 are arranged to receive cigarettes from ramps 3a which guide the cigarettes from the bands 1. The paddle wheels rotate as shown by the arrows so as to lower the cigarettes, which are stripped from the paddles by strippers 4.

A bar 5, which is slidable lengthwise in a guideway 5a, Figure 2, is provided with prongs or pins 6 which form a grill. The pins 6 may be loosely mounted so as to be rotatable about their axes, and may have roughened surfaces. The bar is arranged to be reciprocated by a plate 7 on a pivoted arm 8 which is rocked by a cam 9 engaging a roller 10 on the arm. A spring 11 urges the bar 5 against the plate 7.

Below the level of the bar 5 are two opposed rows of needles 12 which are supported in clamps fixed at the ends of spring arms 13 which are movable inwardly so as to cause the needles to project through apertures in opposed side walls 14, Figure 2. The spring arms tend to move the needles towards each other to the position shown in Figure 3, and suitable cam means (not shown) are provided for urging them outwardly. Adjustable stops are formed by screws 14a, Figures 2 and 3, to limit the inward movement of the spring arms. A support plate 12a, Figure 2, is arranged to be moved into the position shown in full lines after the needles have moved inwardly, and subsequently to be withdrawn to the position indicated in dot and dash lines.

The space between the side walls 14, down to the level of the needles 12, can be regarded as a collecting station or hopper for cigarettes fed thereto by the catcher bands 1.

A movable platform 15, which constitutes a support for cigarettes, is movable vertically from an upper position as shown in full lines in Figures 1 and 2, to a lower position as shown in dot and dash lines in those two figures. The platform is also movable sideways from the lower position shown in Figure 2 to that shown in Figure 3, upwards from the last mentioned position to the upper position shown in Figure 3 in dot and dash lines, and again sideways to the upper full line position, Figures 2 and 3. This sequence of movements is indicated by arrows in Figures 2 and 3 taken in succession.

Beneath the collecting station is a bed 16 adapted to support a number of cigarette trays T. Each tray T consists of a structure adapted to receive cigarettes and comprising a bottom wall 17, two end walls 18, and a central wall or partition 19. The tray is closed at one side by a side wall 20, but is open at the opposite side. The partition 19 divides the tray into two compartments each of which constitutes a receptacle for cigarettes, and as can be seen from Figure 1 each such receptacle can be placed beneath the collecting station so as to receive cigarettes from the latter. It will also be seen from Figures 2 and 3 that the platform 15 can extend within the receptacle, when the latter is in place beneath the collecting station, and that its sideways movement (as illustrated in Figure 3) carries it clear of the receptacle.

Any suitable mechanism may be provided for causing trays T to be moved lengthwise intermittently at suitable intervals of time so as to bring successive receptacles beneath the collecting station in position to receive cigarettes. Such mechanism preferably operates in timed relationship with the mechanism which controls the feeding of the cigarettes into the receptacles.

The operation of the apparatus so far described is as follows:

A tray is placed on the bed 16 with one compartment or receptacle beneath the collecting station. The platform 15 is in the upper position shown in full lines in Figures 1, 2 and 3, and is within the receptacle. The rows of needles 12 are retracted to the positions shown in Figure 3. It will be assumed that the platform 15 already supports a stack of cigarettes whose upper level is above the pins 6.

Cigarettes from the catcher bands 1 are fed down by the paddle wheels 3 into the collecting station. It will be understood that the cigarettes are carried by the catcher bands in directions transverse to their axes, in the usual way, the cigarettes being arranged in single rows on the bands. Thus the cigarettes descending into and through the collecting station are substantially parallel with the pins 6. The descending cigarettes fall on to the stack supported by the platform 15, which descends slowly and gradually lowers the cigarettes into the receptacle. The platform is moved at a suitable speed such that the upper level of the stack of cigarettes formed thereon is maintained above the level of reciprocating pins 6, which by their reciprocatory movement tend to straighten out any misaligned cigarettes. This speed is of course related to the rate at which cigarettes are being fed into the collecting station. Thus as more cigarettes are added to the stack, the latter is continuously lowered into the receptacle. Shortly before the platform 15 reaches its lower position, shown in dot and dash lines in Figures 1 and 2, the rows of needles 12 are moved inwardly and penetrate the end faces of those cigarettes in the collecting station which are at the level of the needles. The platform 15 continues its downward movement to its lower position, and the plate 12a is then moved into the full line position illustrated in Figure 2 directly beneath the layer of cigarettes engaged by the needles, and helps to support the cigarettes. The platform is then moved sideways, withdrawing from the receptacle to the dot and dash position shown at the lower part of Figure 3, and the stack of cigarettes which it supported falls on to the bottom wall 17 of the receptacle. If desired a plate or similar member may be temporarily placed against the side of the stack of cigarettes during the withdrawal of the platform to prevent the cigarettes from being moved sideways by the platform. As soon as the platform has been withdrawn it is raised quickly to the upper position shown in dot and dash lines in Figure 3.

The engagement of a layer of cigarettes by the needles 12 and the plate 12a holds that layer at the level of the needles, and cigarettes above that layer are supported by it, and thus no further cigarettes can move down into the receptacle until the needles and plate are retracted. All the cigarettes below the level of the needles and plate move downward bodily as a stack in the receptacle after the needles have been moved inwardly, so that the top of the stack is below the level of the collecting station and below the upper edge of the walls of the receptacle. Thus it is possible, as soon as the platform 15 has been withdrawn, to move the tray T so as to move the filled receptacle or compartment clear of the collecting station, and replace it by the other compartment or receptacle.

As soon as the tray has been so moved, the platform is moved sideways from the upper dot and dash line position in Figure 3 to the upper full line position.

The needles 12 are then withdrawn from the cigarettes, which are then supported on to the plate 12a, which is then moved sideways clear of the cigarettes to the position shown in dot and dash lines, Figure 2, so that the cigarettes fall on to the platform 15, and the cycle described above is repeated. When this second receptacle has been filled, it is replaced by the first compartment of the next tray T, and the tray which has been filled can be removed in any suitable way.

Figure 4 shows diagrammatically a modification which is used when tipped cigarettes are being collected. Cigarettes tipped with cork or other bands are a little thicker and harder at their tipped ends than at the other. This difference in thickness and hardness may cause difficulty in feeding such cigarettes into a receptacle in the manner described above, since all the cigarettes will tend to be tilted relatively to those beneath them. (It will be understood, of course, that it is desirable for the cigarettes to be fed into the receptacle with their tipped ends pointing in the same direction.) For this reason, in the arrangement shown in Figure 4 the platform 15 is provided with a cigarette-supporting member 21 whose upper surface is normally inclined to the surface of the platform, as shown. The untipped ends of the cigarettes rest on the higher part of the member 21, while the tipped ends rest on the platform itself. In this way the tilting of the cigarettes in the stack as a whole, due to the extra thickness of the tipped ends, can be to some extent neutralised.

The member 21 is angularly movable so that when it is desired to withdraw the platform, the member 21 can be moved so as to bring its upper surface (and hence the lowermost layer of cigarettes) into a horizontal plane, so as to avoid the wedging action, and consequent withdrawal of cigarettes with the platform, that might otherwise result. The member 21 may for example be formed as a pivoted flap, which may be raised in any suitable and convenient way.

Also when tipped cigarettes are being collected, one row of needles 12 may be arranged higher than the other row so as to allow for the angle at which the cigarettes they engage will lie.

Figure 5 illustrates a further modification, in which only one row of needles is employed. These needles impale the cigarettes at one end, as shown, and can momentarily prevent the cigarettes from moving downwardly. In addition, a plate 22, corresponding to the plate 12a in Figure 2, is provided, and is arranged to be slid beneath the cigarettes after they have been engaged by the needles 12, to assist in supporting them. The cigarette-supporting position of this plate 22 is shown in full lines in Figure 5. When the needles have been withdrawn the plate 22 is also withdrawn to allow the cigarettes to move downwardly.

In a further modification, the needles 12 are replaced by a number of fluted rollers which extend across the collecting station so as to intercept all cigarettes fed into the latter. A group of these rollers are illustrated in Figure 6, on a larger scale than that of Figure 1. Each roller has four flutes 23, each capable of receiving a cigarette. As can be seen from Figure 6, the flutes of each roller are displaced 45° from those of adjacent rollers. If the rollers are rotated all at the same speed and in the same direction, cigarettes will be able to pass one at a time between adjacent rollers. When the rollers are stationary, no cigarettes will be able to pass between them. Thus according to this modification the rollers are rotated as long as it is desired to feed cigarettes downwardly through the collecting stations into a receptacle, and are stopped when enough cigarettes have been received on the platform 15. The rollers may be divided into two equal groups, the rollers in one group rotating in one direction and those in the other group rotating in the other.

Figure 8:
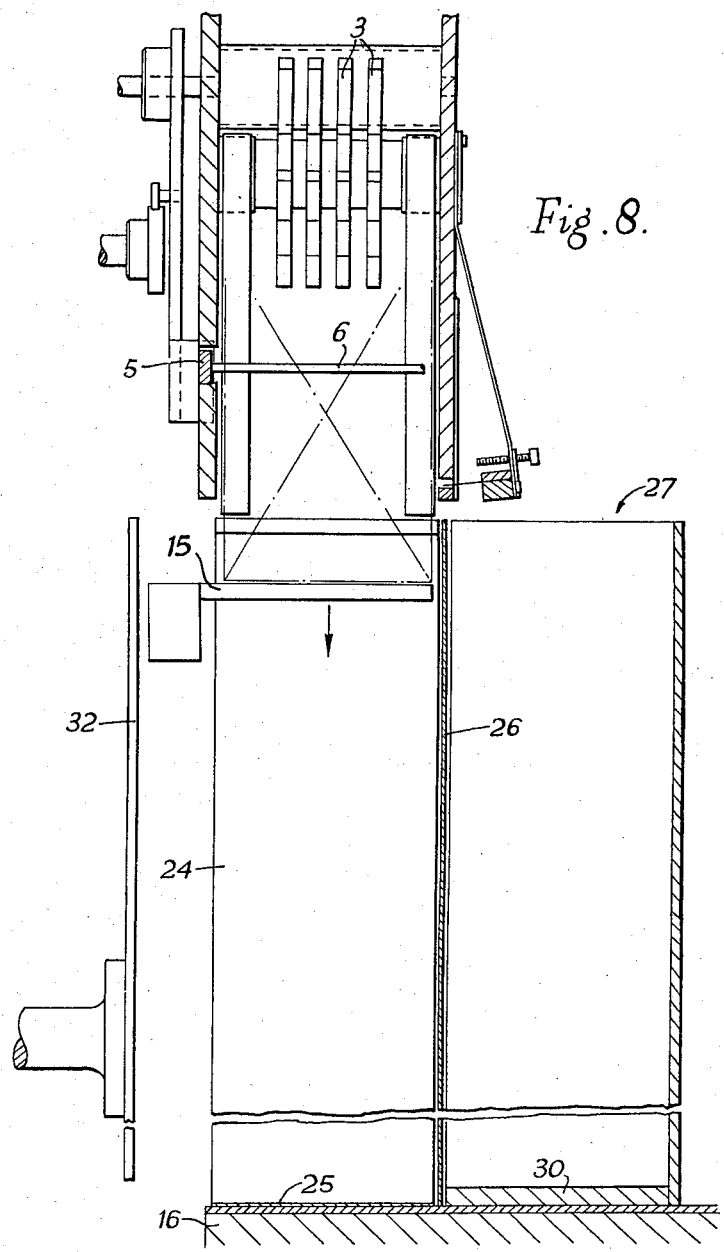
Figures 8 and 9 are sectional end views of the apparatus shown in Figure 7.
Figure 9:
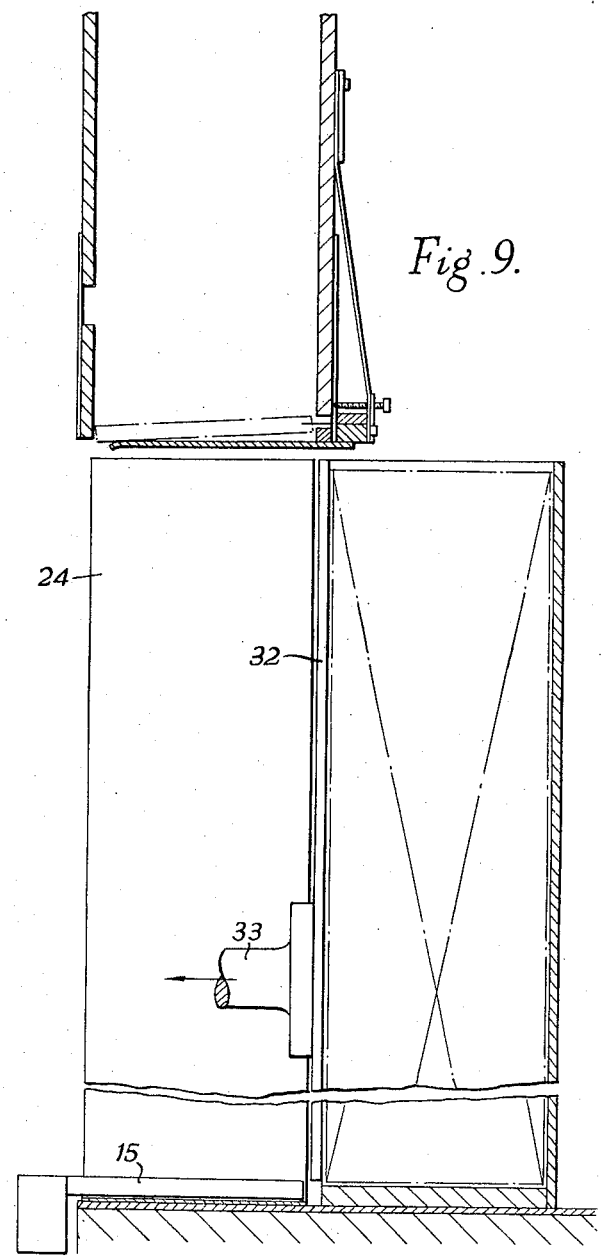

An alternative arrangement is illustrated in Figures 7, 8 and 9. In this arrangement the collecting station and the means for feeding cigarettes to it and downwardly from it are the same as described with reference to Figures 1, 2 and 3, but only a single row of needles 12 is provided. The receptacle into which the cigarettes are fed from the collecting station is in this construction kept in a fixed position on the bed 16, and consists of a single structure having end walls 24 and a bottom wall 25, and open at both sides. A temporary side wall may however be provided by a movable plate 26, see Figures 8 and 10 to 14, which can be moved into position to close one side of the receptacle.

A tray 27 is placed alongside the receptacle to receive cigarettes from the latter. The tray 27 has end walls 28, one side wall 29, and a bottom wall 30 whose upper surface is higher than that of the bottom wall 25 of the fixed receptacle, and a little lower than that of the platform 15 when the latter is in its lowermost position. The tray is sub-divided by a central partition 31 into two compartments, each of which is of the same length as the fixed receptacle and each of which constitutes a container for cigarettes.

A pusher plate 32 fixed to a push-rod 33 (indicated in Figure 7 by a dotted line) is arranged to be movable between the positions in which it is shown in Figures 8 and 9 respectively, that is it can be moved into and through the receptacle and then withdrawn again.

In operation, cigarettes are lowered in the receptacle until the platform 15 reaches its lowest position as shown in Figure 9. Then the pusher plate 32 is moved through the receptacle to push the stack of cigarettes from the receptacle into one of the containers or compartments of the tray 27, which is placed alongside the receptacle so that the latter is in register with the said container or compartment. The platform is then raised again to its uppermost position, there being no need to withdraw it from the receptacle.

While the cigarettes are being fed down into the fixed receptacle, the plate 26 may be held in position between the receptacle and container to assist in the formation of the stack of cigarettes. Means may also be provided to pat the ends of the cigarettes from time to time so as to tend to align them relatively to the plate 26. When the platform reaches the bottom of the receptacle, the plate 26 is of course withdrawn to permit the cigarettes to be pushed into the container by the plate 32.

The tray 27 is then moved to bring the remaining compartment or container opposite the receptacle, and the above-described cycle is repeated. The filled tray 27 is then removed in any convenient way, and replaced by a further tray.

The sequence of operations is illustrated in Figures 10 to 14. In Figure 10, the receptacle is being filled and the plate 26 is in position to close one side of the receptacle. In Figure 11 the pusher plate 32 has pushed the cigarettes into one compartment of the tray 27, the plate 26 having been withdrawn. Figures 12 and 13 illustrate the repetition of this cycle. Figure 14 shows the filled tray 27 returned to its original position, from which it may be removed, e.g. lifted by hand, and replaced by a further tray.

In all the arrangements described, it will be noted that trays that are intended to be moved when filled with cigarettes are provided with a side wall. This is desirable in order to enable the trays to be tilted sideways to lessen the risk that cigarettes might fall out during transport. For example, in the arrangement just described, it is desirable that the tray 27 should be tilted before it is lifted from the position shown in Figure 14, and during such movement, so that the cigarettes will rest partly on the side wall 29.

A modification of the arrangement illustrated in Figures 7-14 is diagrammatically illustrated in Figure 15. In this case the tray 27a has no central partition but constitutes a single container. Two receptacles, formed by compartments A and B of a movable structure 35 having a partition 36, are brought in succession beneath the collecting station for filling. Two pusher plates 32a and 32b are provided side by side, and likewise two removable side plates 26a and 26b are provided.

The structure 35 is first placed with one compartment A beneath the collecting station and this compartment is filled with cigarettes in the manner already described, both the plates 26a and 26b being in position as shown. Then the other compartment B is brought beneath the collecting station and filled. At this stage the structure 35 is in register with the tray 27a. The plates 26a and 26b are then removed and the pushers 32a and 32b simultaneously move through the two compartments to push all the cigarettes into the tray 27a which can then be removed. The structure 35 is then returned to the position shown in Figure 15, and an empty tray 27a put in place, whereupon the cycle is repeated.

In the above description, the word "tray" has, to avoid confusion of terms, been used only in connection with those structures in which cigarettes are taken away, as distinct from those which act merely as temporary receptacles from which the cigarettes are transferred into trays.

Figure 16:
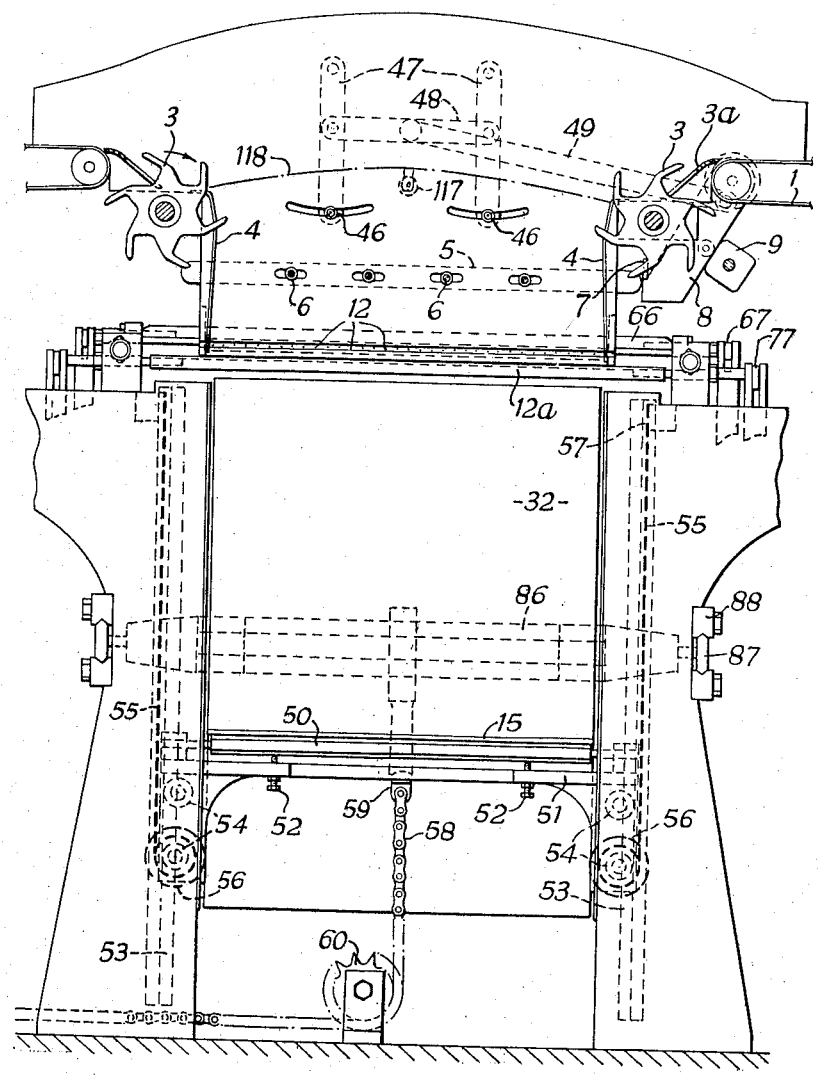
Figure 16 is a view similar to Figure 7 but showing certain modifications and details of the operating mechanism.

Figures 16 and 17 illustrate a modified and preferred arrangement generally similar to that illustrated in Figures 7, 8 and 9, and Figures 16 to 19 show mechanism by which the platform 15, the needles 12, the support plate 12a and the pusher plate 32 are operated automatically in proper sequence.

Referring to Figure 16, it will be seen that in this construction the pins 6 are reduced in number, and that two additional pins 46 are provided at a higher level. The pins 46 are fixed on swinging arms 47 connected by links 48 and 49 to the swinging arm 8, so as to be moved sideways across the upper cigarettes in the collecting station to assist in their even distribution.

The platform 15, which is shown somewhat diagrammatically in Figures 7, 8 and 9, is fixed to a bracket 50, Figures 16 and 17, which is adjustably mounted on a support 51, adjusting screws 52 being provided to enable the height of the bracket 50 to be adjusted. The support 51 is movable up and down in vertical guides 53, wheels 54 on the support running along grooves in the guides 53.

The support 51, and hence the platform 15, is urged upwardly by springs 55 coiled on spools 56 mounted on the support, the free ends of the springs being secured to the frame of the machine at 57. A chain 58 fixed at one end to the support at 59, see Figure 16, extends downwardly from the support 51 and passes about a sprocket 60, the other end being secured to a lever 61, Figure 19. The lever 61 is pivoted at 62 and is movable by a shorter lever 63, which is provided with a roller 64 which engages a cam 65. The cam 65 is so shaped that as it rotates, the lever 61 is gradually swung in a direction such as to pull the chain 59 and thus lower the platform 15, after which the cam allows the lever to swing back so that the platform is raised by the springs 55. The cam 65 makes one revolution for each complete cycle of operations.

The needles 12, the support plate 12a, and the pusher 32 are all caused to move into and out of operation by three cams which rotate in unison in timed relationship with the cam 65. The cam 65 rotates slowly in order to lower the platform 15 slowly, but it is desirable that the needles, support plate and pusher should operate relatively quickly. Accordingly the cams which control the needles, support plate and pusher rotate six times as fast as the cam 65, but means are provided, as will shortly be described, to make these three cams inoperative except at every sixth revolution, so as to allow the needles, support plate and pusher to operate once during each revolution of the cam 65.

The needles 12 are carried by a bar 66 which is connected by links 67 to levers 68 pivoted at 69, Figure 17. An arm 70 of one of the levers 68 is connected by a link 71 to a lever 72 pivoted at 72a. The lever 72 is double-armed, as shown in Figure 17, and carries a roller 73 which rides on a cam 74, mounted on a shaft 75.

The mounting for the support plate 12a is very similar. In this case the plate is mounted on a bar 76 which is linked by links 77 to levers 78 pivoted at 79, an arm 80 on one of the levers 78 being connected by a link 81 to a double-armed lever 82 pivoted at 83 and carrying a roller 84 which rides on a cam 85.

The pusher plate 32, instead of being carried by a push-rod as shown in Figures 7, 8 and 9, is fixed to a forked member 86 to which are secured a pair of wheeled runners 87 arranged to run in horizontal guides 88.

A rod 89 extending from one side to the other of the forked member 86 has fixed to it a block 90 which is slidable in a slot formed in one end of a lever 91 pivoted at 92 and having an arm 93 which carries a roller 94. The roller 94 rides on a cam 95.

The three cams 74, 85 and 95 are all mounted on the shaft 75, and, as mentioned above, rotate at six times the speed of the cam 65, Figures 18 and 19. The bars 66 and 76 carrying the needles 12 and the plate 12a respectively, and the member 86 carrying the pusher plate 32, are all yieldingly urged forwardly by suitable means (not shown), so that the rollers 73, 84 and 94 are yieldingly urged against their respective cams. In order to prevent the needles, support plate and pusher from moving forwardly except once during each cycle of operations, a rockshaft 96, Figures 17 and 18, is provided with an arm 97 having a catch 98 which can engage a similar catch 99 on one of the runners 87. The shaft also carries an arm 100 having two catches 101 which can engage with similar catches 102 on extensions 172, 182 of the levers 72 and 82. When the shaft 96 is in the angular position shown in Figure 17 and the catches mentioned above are in engagement, the pusher 32 is prevented from moving forwardly, and the cam rollers 73 and 84 are held in the positions shown, thus preventing the needles 12 and the support plate 12a from moving inwardly.

The shaft 96 also carries an arm 103, Figure 18, which has a roller arranged to ride on a crown cam 104 mounted on a shaft 105. The cam 65 is also fixed on the shaft 105, and thus the two cams 65 and 104 rotate in unison. The crown cam 104 has a projection 106 which turns the arm 103 once every revolution of the cam, thereby rocking the shaft 96 and moving the catches 98 and 101 so as to permit the needles 12, the plate 12a, and the pusher 32 to be moved forwardly under the control of the cams 74, 85 and 95.

The shaft 75, on which the cams 74, 85 and 95 are mounted, has fixed to it a bevel gear 107 (Figure 18) which meshes with a further bevel gear 108 on a shaft 108a.

The shaft 108a also carries a gear 109, which, through a train of gears 110, 110a, and 111, drives the shaft 105 at an angular speed one-sixth of that of the shaft 75. The shaft 108a is itself driven by a chain and sprocket drive from a shaft 112, which in turn is driven by an electric motor 113 through suitable reduction gearing contained in a gear box 114, and through a clutch 115.

It is important that a substantial quantity of cigarettes should be maintained at the collecting station above the level of the needles 12, and to ensure this, a photoelectric cell 116 and an electric lamp 117, shown diagrammatically in Figures 17 and 18, are provided at a suitable level on opposite sides of the space into which the cigarettes are fed from the catcher bands 1. In Figure 17 the dot and dash line 118 indicates approximately a suitable level for the mass of cigarettes. The photoelectric cell 116 is suitably connected to the clutch 115 in such a way as to cause the clutch to be broken if the cell is energised by a light beam from the lamp 117. As long as the light beam is obscured by cigarettes, the clutch is engaged and the operations described above proceed cyclically. If for any reason the level of cigarettes falls sufficiently to allow light from the lamp to reach the cell 116, the clutch is broken and the cams 65, 74, 85 and 95 cease to rotate. Accordingly the entire operation of the device ceases until the desired level of the cigarettes is again reached, whereupon the clutch 115 is re-engaged and the cycle of operations proceeds as before.

I claim:

1. Apparatus for collecting cigarettes, comprising a collecting station, a receptacle beneath said collecting station, a platform movable downwardly within said receptacle, means to feed cigarettes continuously in a loose condition into said collecting station to be supported as a stack on said platform, means to move said platform downwardly to lower the said stack into the receptacle as the height of the stack increases, cigarette arresting means comprising means to engage end faces of cigarettes, and operative, when a desired quantity of the cigarettes forming the stack has been lowered past said arresting means, to engage and hold against downward movement those cigarettes which are immediately above said quantity, whereby the said quantity of cigarettes can be removed from the platform.

2. Apparatus as claimed in claim 1, wherein the said means to move the said platform downwardly is arranged to continue the downward movement of the platform after operation of said arresting means to hold cigarettes against downward movement, so as to separate the said desired quantity of cigarettes from those at and above the level of said arresting means.

3. Apparatus as claimed in claim 2, comprising a support plate and means to move said plate into a position immediately beneath said arresting means after the said desired quantity of cigarettes has been lowered far enough to leave space for said plate.

4. Apparatus as claimed in claim 1, wherein the said arresting means comprises a row of needles arranged to be moved towards cigarettes so as to penetrate end faces of cigarettes at a desired level and to hold them at that level, and thereafter to be moved away to release the said cigarettes.

5. Apparatus as claimed in claim 4, comprising two rows of needles, arranged one at each side of the body of cigarettes moving through the collecting station.

6. Apparatus as claimed in claim 1, wherein the means to arrest downward movement of cigarettes comprises a number of parallel fluted rollers, which are rotatable so as to allow cigarettes to fall downwardly between them, but which when stationary prevent such downward movement.

7. Automatic cigarette-collecting apparatus, comprising a collecting station, means to feed cigarettes to said station, a receptacle beneath said station to receive cigarettes therefrom, a platform movable downwardly in the said receptacle to support cigarettes while lowering them, a row of needle-like elements mounted alongside said station, means operative in timed relationship with the movement of said platform to move said needle-like elements into end faces of cigarettes so as to prevent downward movement of cigarettes at and above the level of said elements when a desired quantity of cigarettes has been lowered into the receptacle, and a pusher operative in timed relationship with the movement of said platform to push the said quantity of cigarettes bodily out of the receptacle into an adjacent container.

8. Apparatus as claimed in claim 7, comprising detector means to detect the quantity of cigarettes in said collecting station, and means responsive to said detector means to arrest the operation of said platform if the level of cigarettes in the collecting station falls below a predetermined level.

9. Apparatus as claimed in claim 7, comprising two receptacles arranged to be brought one after the other beneath the collecting station and filled in turn, a single container which is of twice the length of each of the receptacles, and means to push cigarettes simultaneously from both receptacles into said single container, whereafter the two receptacles can be returned to their original positions.

10. Apparatus as claimed in claim 7, comprising mean to move the said platform sideways out of the receptacle, after the said platform has moved downwardly therein, so as to permit lengthwise movement of the receptacle.

References Cited in the file of this patent

UNITED STATES PATENTS

| | | |
|---|---|---|
| 1,770,901 | Dietmann | July 22, 1930 |
| 2,730,144 | Joa | Jan. 10, 1956 |